United States Patent
Takada et al.

(10) Patent No.: US 9,579,831 B2
(45) Date of Patent: Feb. 28, 2017

(54) PLASTIC WORKING METHOD AND SPINNING MACHINE USED IN THE SAME

(71) Applicant: Nihon Spindle Manufacturing Co., Ltd., Hyogo (JP)

(72) Inventors: Yoshiaki Takada, Hyogo (JP); Jyunji Kishino, Hyogo (JP); Taishi Shirai, Hyogo (JP)

(73) Assignee: NIHON SPINDLE MANUFACTURING CO., LTD., Hyogo (JP)

( * ) Notice: Subject to any disclaimer, the term of this patent is extended or adjusted under 35 U.S.C. 154(b) by 0 days.

(21) Appl. No.: 14/707,760

(22) Filed: May 8, 2015

(65) Prior Publication Data
US 2015/0239156 A1    Aug. 27, 2015

Related U.S. Application Data

(63) Continuation of application No. PCT/JP2013/073172, filed on Aug. 29, 2013.

(30) Foreign Application Priority Data

Nov. 12, 2012  (JP) .................................. 2012-248654

(51) Int. Cl.
*B21D 22/16* (2006.01)
*B29C 43/04* (2006.01)
(Continued)

(52) U.S. Cl.
CPC .............. *B29C 43/04* (2013.01); *B21D 22/14* (2013.01); *B21D 22/16* (2013.01); *B21D 51/263* (2013.01); *B29L 2031/772* (2013.01)

(58) Field of Classification Search
CPC ........ B21D 15/06; B21D 17/04; B21D 22/14; B21D 22/16; B21D 51/10; B21D 51/263;
(Continued)

(56) References Cited

U.S. PATENT DOCUMENTS 1,666,581 A * 4/1928 Rainaud ................. B21D 22/18
                                                                72/80
3,782,314 A * 1/1974 Franek ................... B21D 19/06
                                                               206/509
(Continued)

FOREIGN PATENT DOCUMENTS

GB            1038766 A  *  8/1966  ........... B21D 51/263
JP       2003-305527 A     10/2003
(Continued)

*Primary Examiner* — Edward Tolan
(74) *Attorney, Agent, or Firm* — Michael Best & Friedrich LLP

(57) ABSTRACT

A spinning machine includes: a main shaft which includes a chuck holding a cylindrical material having a bottom and a regulation member; a mandrel which is inserted inside from an opening side end portion of the material; and a press roller which presses the opening side end portion of the material. The spinning machine molds a circumferential groove portion on the opening side end portion so that an inner diameter of the opening side end portion of the material is smaller than an inner diameter of a body of the material by pushing a press roller while rotating the material around the axial center of the main shaft, and at least a portion of the inserted mandrel is formed so that a gap is provided between the portion and an inner circumferential surface after the opening side end portion of the material is plastically deformed.

3 Claims, 7 Drawing Sheets

(51) Int. Cl.
*B21D 22/14* (2006.01)
*B21D 51/26* (2006.01)
*B29L 31/00* (2006.01)

(58) Field of Classification Search
CPC . B21D 51/2638; B21C 37/156; B21C 37/205; B29C 43/04
See application file for complete search history.

(56) References Cited

U.S. PATENT DOCUMENTS

| | | | | |
|---|---|---|---|---|
| 4,058,998 | A | * | 11/1977 | Franek ............... B21D 51/2615 413/1 |
| 4,404,829 | A | * | 9/1983 | Dorakovski ......... B21D 53/261 29/892.3 |
| 4,691,550 | A | * | 9/1987 | Dietzel ................. B21D 17/00 29/508 |
| 5,339,668 | A | * | 8/1994 | Manning ............ F16L 33/2076 72/70 |
| 6,536,253 | B1 | | 3/2003 | Kanemitsu et al. |

FOREIGN PATENT DOCUMENTS

| | | |
|---|---|---|
| JP | 2007-090373 A | 4/2007 |
| JP | 4602060 B2 | 12/2010 |

* cited by examiner

PLASTIC WORKING METHOD AND SPINNING MACHINE USED IN THE SAME

INCORPORATION BY REFERENCE

Priority is claimed to Japanese Patent Application No. 2012-248654, filed Nov. 12, 2012, and International Patent Application No. PCT/JP2013/073172, the entire content of each of which is incorporated herein by reference.

BACKGROUND

Technical Field

Certain embodiments of the invention relates to a plastic working method which performs plastic working on an opening side end portion of a cylindrical material having a bottom, and a spinning machine used in the same, and particularly, to a plastic working method capable of processing a product in which an inner diameter of the opening side end portion is smaller than an inner diameter of a material body, and a spinning machine used in the same.

Description of the Related Art

In the related art, a spinning machine is suggested, which forms a groove portion on an outer circumferential surface in an opening side end portion of a cylindrical material having a bottom and by which a product (for example, a brake piston for a disk brake) in which an inner diameter of the opening side end portion is smaller than an inner diameter of a material body can be obtained with plastic working.

SUMMARY

According to an embodiment of the present invention, there is provided a plastic working method of molding a circumferential groove portion on an opening side end portion of a cylindrical material having a bottom by a spinning machine so that an inner diameter of the opening side end portion of the material is smaller than an inner diameter of a body of the material by pushing a press roller in a direction approaching a rotation center of a main shaft while rotating the material around the axial center of the main shaft by rotatably driving the main shaft in a state where the cylindrical material having a bottom is held to the main shaft. The molding is performed in an unrestricted state in which an inner circumferential side of the opening side end portion of the material is freely deformable.

In addition, according to another embodiment of the present invention, there is provided a spinning machine, including: a main shaft in which a chuck holding an outer circumferential surface of a cylindrical material having a bottom and a regulation member abutting on an outside bottom surface of the material are disposed; a mandrel which is inserted inside from an opening side end portion of the material, includes a tip abutting on an inner bottom surface of the material, and holds the bottom portion of the material by the regulation member; and a press roller which presses the opening side end portion of the material. The spinning machine molds a circumferential groove portion on the opening side end portion so that an inner diameter of the opening side end portion of the material is smaller than an inner diameter of a body of the material by pushing a press roller in a direction approaching the mandrel while rotating the material around the axial center of the main shaft by rotatable driving of the main shaft, and at least a portion of the mandrel inserted into the inner portion of the material is formed so that a gap is provided between the portion and an inner circumferential surface after the opening side end portion of the material is plastically deformed.

BRIEF DESCRIPTION OF THE DRAWINGS

FIG. 2A is a view in a state where a material is attached, FIG. 2B is a view in a state where the working is completed, and FIG. 2C is an enlarged view of an A portion of FIG. 2B.

FIG. 3A is a view in a state where a material is attached, FIG. 3B is a view in a state where the working is completed, and FIG. 3C is an enlarged view of a B portion of FIG. 3B.

DETAILED DESCRIPTION

Figure 3A:
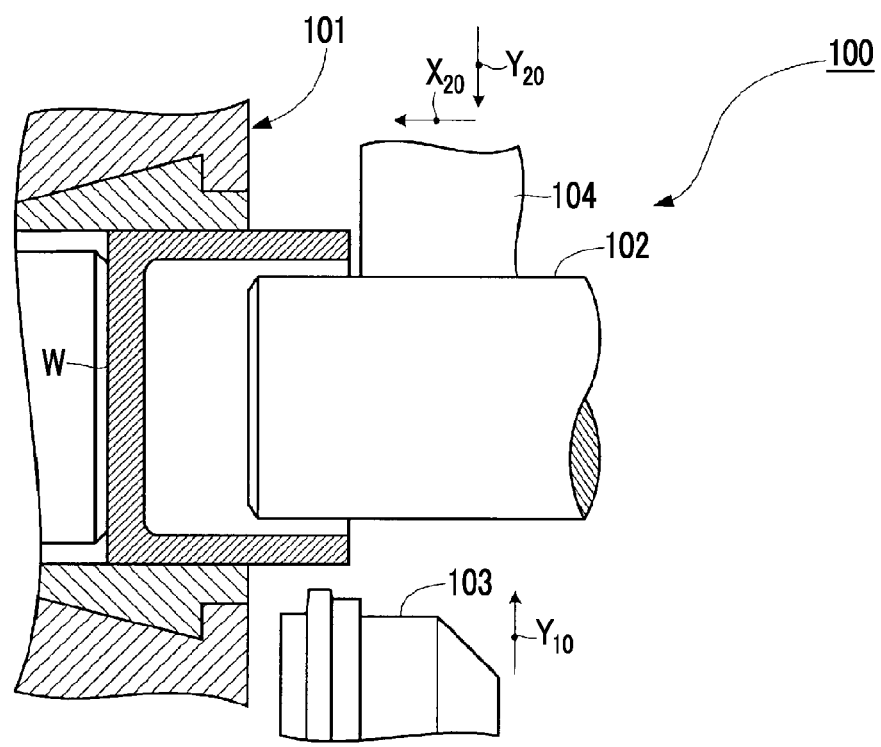
FIGS. 3A to 3C are operation explanation views of plastic working performed by a spinning machine of the related art.

As shown in FIG. 3A, a spinning machine 100 according to the related art includes a chuck 101 which is disposed on a main shaft (not shown) and holds an outer circumferential surface of a cylindrical material W having a bottom.

A mandrel 102 which is coaxially disposed with the main shaft is inserted into an inner portion of the material W held by the chuck 101 from an opening side end portion of the material.

A press roller 103 including a protrusion corresponding to a groove portion of a product is disposed so as to be movable in a direction (an arrow $Y_{10}$ direction in FIGS. 3A and 3B) perpendicular to the axial center of the main shaft, and a regulation roller 104, which comes into contact with the opening side end surface of the material W and rolls, is disposed so as to be movable in an axial direction (an arrow $X_{20}$ direction in FIGS. 3A and 3B) of the main shaft and in a direction (an arrow $Y_{20}$ direction in FIGS. 3A and 3B) perpendicular to the axial center of the main shaft.

Figure 3B:
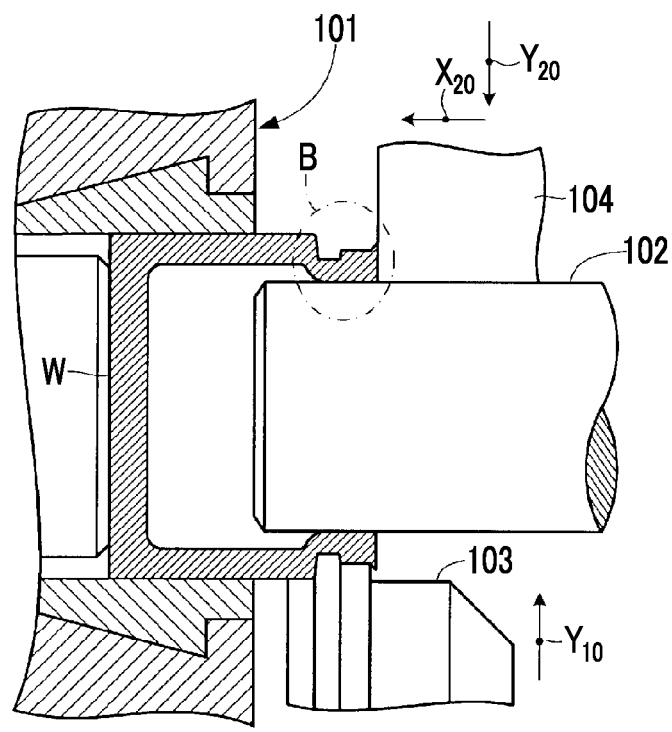

In the spinning machine 100, in a state where the material W is rotated around the axial center of the main shaft by rotatable driving of the main shaft, as shown in FIGS. 3A and 3B, the opening side end portion of the material W is pressed so as to be pressed against the mandrel 102 by the press roller 103. In this case, extension in the axial direction of the opening side end portion of the material W generated by the press roller 103 is regulated by the regulation roller 104.

In this way, plastic working is performed, in which the groove portion is formed on the outer circumferential surface of the opening side end portion of the material W, and an inner diameter of the opening side end portion of the material W is smaller than an inner diameter of a body of the material.

Then, for example, the cylindrical material W having a bottom, which is subjected to the plastic working by the spinning machine 100, is obtained by a processing method such as forging, and thus, variation between a required length dimension or sheet thickness dimension and an actual length dimension or sheet thickness dimension is relatively large.

In addition, during the plastic working performed by the spinning machine 100, as shown in FIG. 3B, the outer circumferential surface of the opening side end portion of the material W is pushed by the press roller 103, the inner circumferential surface is pushed by the mandrel 102, and the end surface is pushed by the regulation roller 104.

Accordingly, in the plastic working performed by the spinning machine 100, in a case where the actual length dimension of the material W is longer than the required dimension or the actual sheet thickness dimension of the material W is thicker than the required dimension, since excess thickness is blocked by the mandrel 102 even when the excess thickness of the material W flows to the inner circumferential surface side of the material W, and the excess thickness is blocked by the regulation roller 104 even when the excess thickness flows to the end surface side of the material W, there is no relief spaced for the excess thickness, and thus, it is not possible to secure molding accuracy of the important groove portion.

Figure 3C:
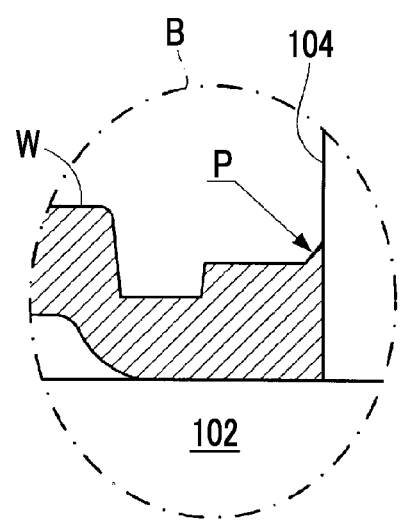

Meanwhile, for example, when the problem with respect to the relief space for the excess thickness is solved by devising the shape of the press roller 103, the excess thickness flows to the outside in the radial direction from a portion in which a close contact state is relatively loosened between the opening side edge of the material W and the press roller 103. Accordingly, in the product in which high accuracy in the outer circumferential side shape dimension is required, the opening side edge exceeds an allowable value of a design dimension, and thus, there is a concern that the excess thickness may protrude to the outside in the radial direction as shown an arrow P in FIG. 3C.

It is desirable to provide a plastic working method and a spinning machine used in the same capable of securing accuracy of the product in which high accuracy is required in the shape dimensions of the outer circumferential surface side even when there is variation in the length dimension or the sheet thickness dimension of the cylindrical material having a bottom.

According to embodiments of the invention, it is possible to mold an outer circumferential surface and an end surface of the opening side end portion of the material by a finishing roller including a roller surface which can simultaneously come into contact with the outer circumferential surface and the end surface in the opening side end portion of the material.

According to embodiments of the invention, it is possible to provide the finishing roller including the roller surface which can simultaneously come into contact with the outer circumferential surface and the end surface in the opening side end portion of the material.

According to a plastic working method of the embodiment of the invention, the material is molded so that an inner diameter of the opening side end portion of the material is smaller than an inner diameter of a body of the material, and thus, molding is performed in an unrestricted state in which an inner circumferential side of the opening side end portion of the material is freely deformable.

Moreover, according to a spinning machine of the embodiment of the invention, a gap is provided between the mandrel and an inner circumferential surface after the opening side end portion of the material is plastically deformed.

Accordingly, even when an actual length dimension of the material is longer than a required dimension or an actual sheet thickness dimension of the material is thicker than a required dimension, an excess thickness of the material flows into the gap side, and it is possible to release the excess thickness of the material to the inside in the radial direction in which high accuracy is not required in a product which requires high accuracy for the shape dimensions of the outer circumferential surface side.

Therefore, it is possible to secure accuracy of the product in which high accuracy is required in the shape dimensions of the outer circumferential surface side even when there is variation in the length dimension or the sheet thickness dimension of the cylindrical material having a bottom.

Moreover, particularly, by abutting the tip of the mandrel on the inner bottom surface of the material and holding the bottom portion of the material by the regulation member, since swing of the material during the plastic working is securely decreased by the mandrel, it is possible to previously prevent occurrence of damages applied to the material from the chuck, the press roller, and the finishing roller due to the swing of the material or lack of torque transmission to the material due to the swing, and it is possible to stably secure quality of the product.

Moreover, the outer circumferential surface and the end surface of the opening side end portion of the material are molded by the finishing roller including the roller surface which can simultaneously come into contact with the outer circumferential surface and the end surface in the opening side end portion of the material, and thus, it is possible to finish the opening side end portion of the product with higher accuracy.

Hereinafter, embodiments of a plastic working method according to the present invention and a spinning machine used in the method will be described with reference to the drawings.

Spinning Machine

Figure 1:
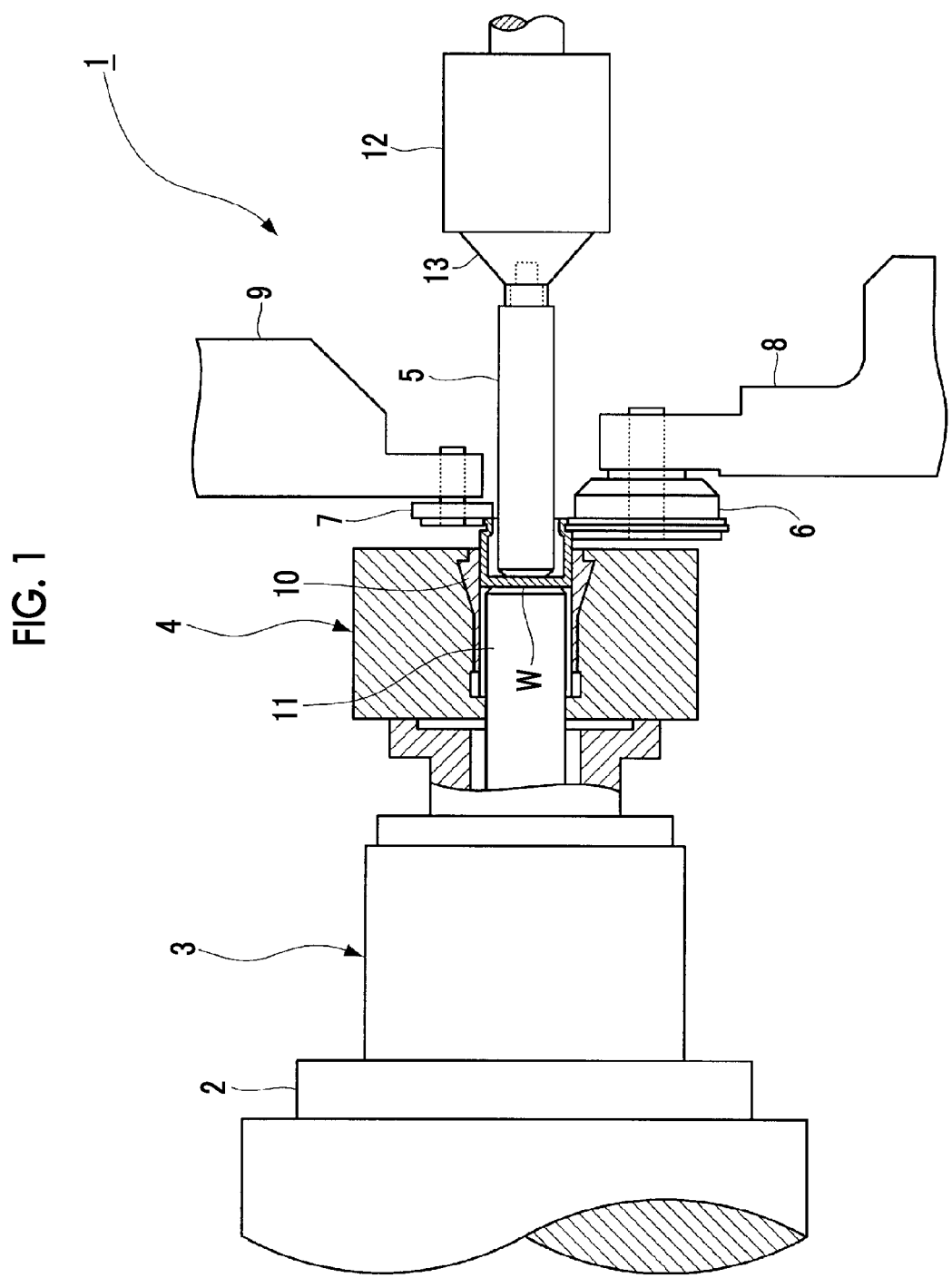
FIG. 1 is a front view in which a cross-section of a spinning machine according to an embodiment of the present invention is partially cut out.

A spinning machine 1 shown in FIG. 1 includes a chuck 4 which is disposed on a tip portion of a main shaft 3 connected to a rotation mechanism 2 and holds an outer circumferential surface of a cylindrical material W having a bottom.

A mandrel 5, which is coaxially disposed with the main shaft 3 at a position opposite to the chuck 4, is inserted into the inner portion of the material W held by the chuck 4 from an opening side end portion of the material W.

In addition, a press roller 6 and a finishing roller 7 are disposed in the vicinity of the mandrel 5, and each of the rollers 6 and 7 are rotatably attached to each of holders 8 and 9.

Chuck

The chuck 4 is formed in a cylindrical shape, a holding member 10 corresponding to the outer diameter of the material W is disposed in the inner portion of the chuck 4, a regulation member 11 corresponding to the length of the attached material W is disposed in the inner portion thereof, and the chuck can fix the material W at the position shown in FIG. 1.

In addition, the chuck 4 is configured so that the chuck 4 is removed from the main shaft 3 along with the holding member 10 and the regulation member 11 and can be replaced with the chuck 4 corresponding to the product shape (the material W).

Mandrel

Figure 2A:
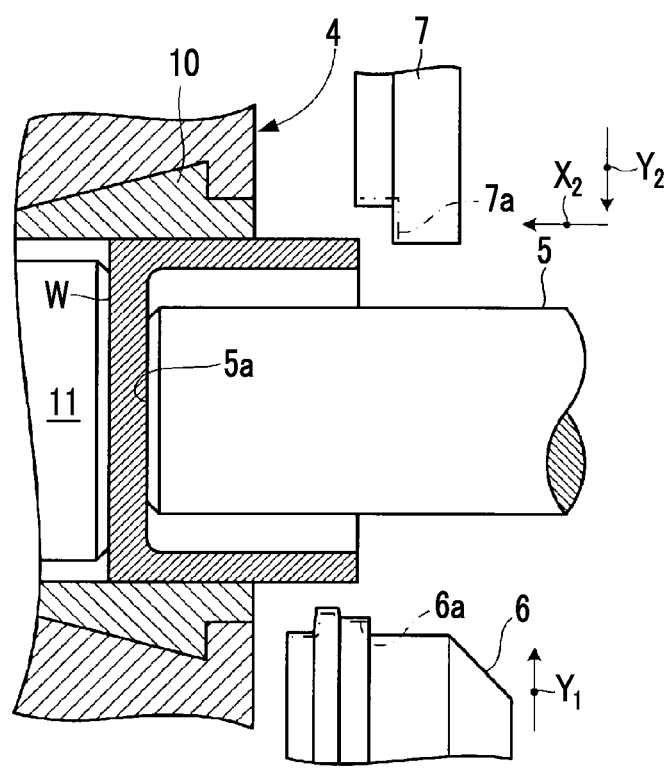
FIGS. 2A to 2C are operation explanation views of plastic working performed by the spinning machine of the present embodiment.
Figure 2B:
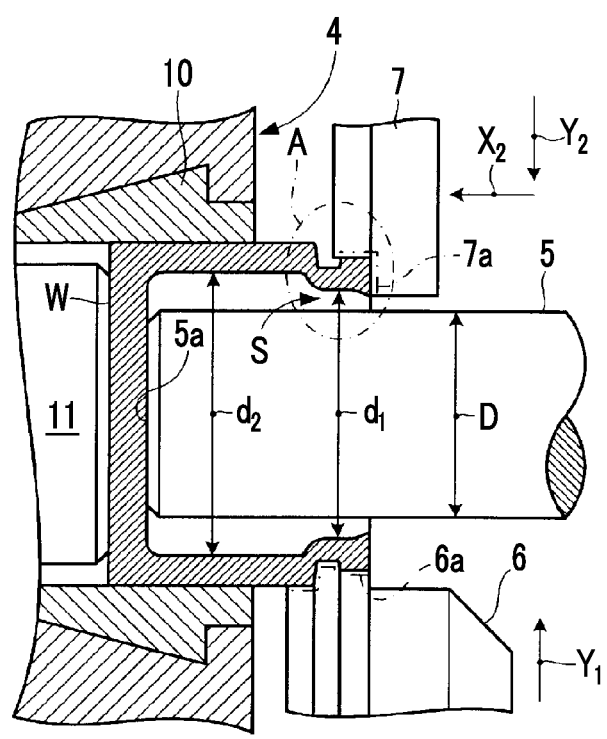

The mandrel 5 is configured in a round bar member, and as shown in FIG. 2A, includes a tip surface 5a which abuts on the inner bottom surface of the material W and holds the bottom portion of the material W by the regulation member 11, and has a diameter which is smaller than the inner diameter of the opening side end portion of the material W over the entire length of the mandrel after the opening side end portion is plastically deformed. In this way, as shown in FIG. 2B, a predetermined gap S is provided between the inner circumference surface of the opening side end portion after the opening side end portion of the material W is plastically deformed and the mandrel 5.

Accordingly, a diameter D of the mandrel 5 is set so that the gap S is securely maintained. That is, the diameter D is set so as to be smaller than a protrusion dimension of the material W at a position (generally, the opening side edge of the material W) at which the opening side end portion of the material W protrudes the most after the opening side end portion of the material W is plastically deformed.

Moreover, if the diameter D of the mandrel 5 is set to be extremely small so that the gap S is securely maintained, since the bottom portion of the material W or the mandrel 5 is deformed, or effects described below of holding the material W by the mandrel 5 and the regulation member 11 are not easily obtained, the diameter D is set to be at least 40% or more of an inner diameter $d_2$ of the material W, preferably, 50% or more of the inner diameter $d_2$, and more preferably, 70% or more of the inner diameter $d_2$.

As shown in FIG. 1, in order to replace the mandrel 5 with a suitable mandrel according to a distance from the opening side end surface of the material W to the inner bottom surface, the inner diameter of the opening side end portion of the material W after the opening side end portion is plastically deformed, or the like, the mandrel is detachably attached to a mounting member 13 which is disposed on the tip portion of a driven mechanism 12 which is movable in the axial direction of the main shaft 3.

Moreover, if the tip of the mandrel 5 can abut (preferably, can come into surface-contact with) the inner bottom surface of the material W and the mandrel 5 can provide the predetermined gap S (refer to FIG. 2B) between the mandrel 5 and the inner circumference surface of the opening side end portion after the opening side end portion of the material W is plastically deformed, the shape of the mandrel 5 is not particularly limited. That is, a mandrel having the outer circumferential surface which is tapered in the axial direction or a hollow mandrel may be adopted, or mandrels having various shapes such as a polygonal shaped cross-section may be adopted.

Press Roller

As shown in FIG. 2B, the press roller 6 includes an uneven roller surface 6a for performing plastic working of a desired uneven shape (a circumferential groove portion G on the opening side end portion of the material W) on the outer circumferential surface of the opening side end portion of the material W.

The holder 8 (refer to FIG. 1) which rotatably supports the press roller 6 moves in a direction (an arrow $Y_1$ direction in FIG. 2B) perpendicular to the axial center of the main shaft 3 according control signals from a control device (not shown).

Finishing Roller

As shown in FIG. 2B, the finishing roller 7 includes a roller surface 7a which can simultaneously come into contact with the outer circumferential surface and the end surface in the opening side end portion of the material W.

The holder 9 (refer to FIG. 1) which rotatably supports the finishing roller 7 moves in the axial direction (an arrow $X_2$ direction in FIG. 2B) of the main shaft 3 and in the direction (an arrow $Y_2$ direction in FIG. 2B) perpendicular to the axial center of the main shaft 3 according control signals from the control device (not shown).

Plastic Working

The plastic working with respect to the material W using the spinning machine 1 configured as described above is performed as follows.

First, as shown in FIG. 2A, the mandrel 5 is inserted into the inner portion of the material W from the opening end portion of the material W which is held by the chuck 4, and thus, the tip surface 5a of the mandrel 5 enters the material W until the tip surface abuts the inner bottom surface of the material W. Accordingly, it is possible to stably hold the material W by holding of the mandrel 5 and the regulation member 11 and by holding of the holding member 10 without swing (without minute vibration) during the plastic working.

Figure 2C:
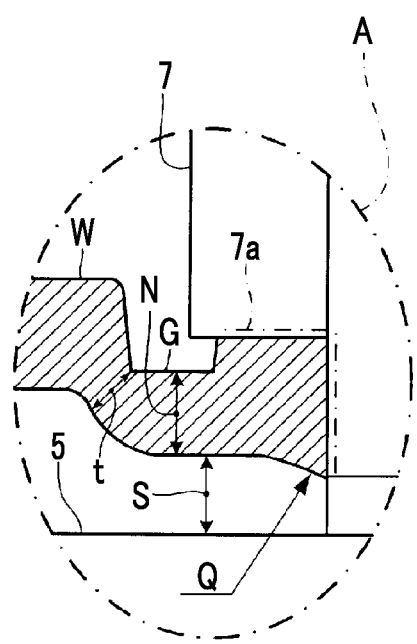

Subsequently, as shown in FIGS. 2A and 2B, the press roller 6 is pressed against the opening side end portion of the material W in the arrow $Y_1$ direction in the drawings while the material W is rotated around the axial center of the main shaft 3 by the rotatable driving of the main shaft 3 performed by the rotation mechanism 2 (refer to FIG. 1). Accordingly, the plastic working is performed so that the inner diameter $d_1$ of the opening side end portion of the material W is smaller than inner diameter $d_2$ of the body of the material W ($d_1 < d_2$), and plastic working of an uneven shape according to the shape of the roller surface 6a of the press roller 6 is performed on the outer circumferential surface of the opening side end portion of the material W. In this case, as shown in FIG. 2C, since the inner diameter $d_1$ of the opening side end portion of the material W is smaller than the inner diameter $d_2$ of the body of the material W, it is possible to sufficiently secure the groove portion G or a thickness N in the vicinity of the groove portion G.

Simultaneously with the plastics working performed by the press roller 6, the finishing roller 7 presses a corner portion, at which the outer circumferential surface and the end surface in the opening side end portion of the material W cross each other, in the arrow $X_2$ direction and the arrow $Y_2$ direction in FIG. 2B. Accordingly, the shape of the corner portion of the opening side end portion of the obtained product is formed with higher accuracy.

In this case, preferably, the shapes of the press roller 6 and the finishing roller 7 are set so that the finishing forming with respect to the outer circumferential surface in the opening side end portion of the material W is performed by not the press roller 6 but the finishing roller 7.

In addition, in the present embodiment, the movement in the arrow $Y_1$ direction of the press roller 6 and the movements in the arrow $X_2$ direction and the arrow $Y_2$ direction of the finishing roller 7 are simultaneously performed. However, the movements of the press roller 6 and the finishing roller 7 may be performed in an arbitrary order.

Effects

As shown in FIG. 2C, in the spinning machine 1 of the present embodiment, since the gap S is provided between the inner circumferential surface of the opening side end portion of the material W and the mandrel 5 after the material W is plastically deformed, the molding is performed in an unrestricted state in which the inner circumferential side of the opening side end portion of the material W is freely deformable while the inner diameter $d_1$ of the opening side end portion of the material W is formed to be smaller than the inner diameter $d_2$ of the body of the material W ($d_1 < d_2$).

Accordingly, even when an actual length dimension of the material W is longer than a required dimension or an actual sheet thickness dimension of the material W is thicker than a required dimension, an excess thickness of the material W flows into the gap S side, and as shown by an arrow Q in FIG. 2C, it is possible to release the excess thickness of the material to the inside in the radial direction in which high accuracy is not required in a product which requires high accuracy for the shape dimensions of the outer circumferential surface side. Therefore, it is possible to secure accuracy of the product in which high accuracy is required in the shape dimensions of the outer circumferential surface side even when there is variation in the length dimension or the sheet thickness dimension of the cylindrical material having a bottom.

Moreover, since the end surface in the opening side end portion of the material W is restrained by the finishing roller 7, a decrease in the thickness of the material W according to the molding performed by the press roller 6, particularly, a decrease in a maximum thickness portion t of the material W, is prevented, and thus, it is possible to secure strength of the product.

In addition, particularly, since swing of the material W is securely prevented by the mandrel 5 abutting on the inner bottom surface of the material W during the plastic working, it is possible to previously prevent occurrence of damages applied to the material W from the holding member 10 of the chuck 4, the press roller 6, and the finishing roller 7 due to the swing of the material W or lack of torque transmission to the material W due to the swing, and it is possible to stably secure quality of the product.

In addition, the shapes (for example, perpendicularity) of the outer circumferential surface and the end surface in the opening side end portion of the material W and the states of the surfaces are finished by the finishing roller 7, and it is possible to finish the opening side end portion of the product with higher accuracy.

In the plastic working method and the spinning machine used in the same according to the embodiment of the invention, even when there is variation in the length dimension or the sheet thickness dimension of the cylindrical material having a bottom, it is possible to release the excess thickness of the material to the inner circumferential surface side. Accordingly, the embodiment of the invention can be suitably used for the processing of the product in which high accuracy is required in the shape dimensions of the outer circumferential surface side.

It should be understood that the invention is not limited to the above-described embodiment, but may be modified into various forms on the basis of the spirit of the invention. Additionally, the modifications are included in the scope of the invention.

What is claimed is:

1. A plastic working method comprising:
   securing a cylindrical material to a main shaft, the cylindrical material including a bottom wall and an opening side end portion adjacent an end surface;
   rotating the cylindrical material around an axis of the main shaft;
   moving a press roller in a direction toward the axial center to engage the cylindrical material and form a circumferential groove portion on an outer circumferential surface of the opening side end portion of the cylindrical material so that an inner diameter of the opening side end portion of the material is smaller than an inner diameter of a body of the material;
   moving a finishing roller toward an axis of rotation of the main shaft to simultaneously engage the outer circumferential surface and the end surface of the opening side end portion of the cylindrical material,
   wherein the cylindrical material is supported in an unrestricted state in which an inner circumferential surface of the opening side end portion of the material is freely deformable.

2. A spinning machine, comprising:
   a chuck for holding an outer circumferential surface of a cylindrical material having a bottom wall, the chuck adapted to be driven by a main shaft about an axial center;
   a regulation member adapted to abut an outer surface of the bottom wall of the material;
   a mandrel adapted to extend through an opening side end portion of the cylindrical material, the mandrel including a tip adapted to abut an inner surface of the bottom wall of the cylindrical material, the mandrel holding the bottom wall of the material adjacent the regulation member; and
   a press roller including a press roller surface for engaging an outer circumferential surface of the opening side end portion of the cylindrical material, the press roller movable in a direction toward the mandrel and adapted to mold a circumferential groove portion on the outer circumferential surface of the opening side end portion so that an inner diameter of the opening side end portion of the material is smaller than an inner diameter of a body of the material,
   a finishing roller including a finishing roller surface for simultaneously engaging the outer circumferential surface and an end surface in the opening side end portion of the material, the finishing roller movable in a direction toward an axis of rotation of the chuck, and
   wherein at least a portion of the mandrel adapted to extend through the opening side end portion of the cylindrical material is radially spaced apart from an inner circumferential surface by a gap after the opening side end portion of the cylindrical material is plastically deformed.

3. The spinning machine of claim 2, wherein the gap permits free deformation of the inner circumferential surface of the cylindrical material toward the mandrel.

* * * * *